UNITED STATES PATENT OFFICE.

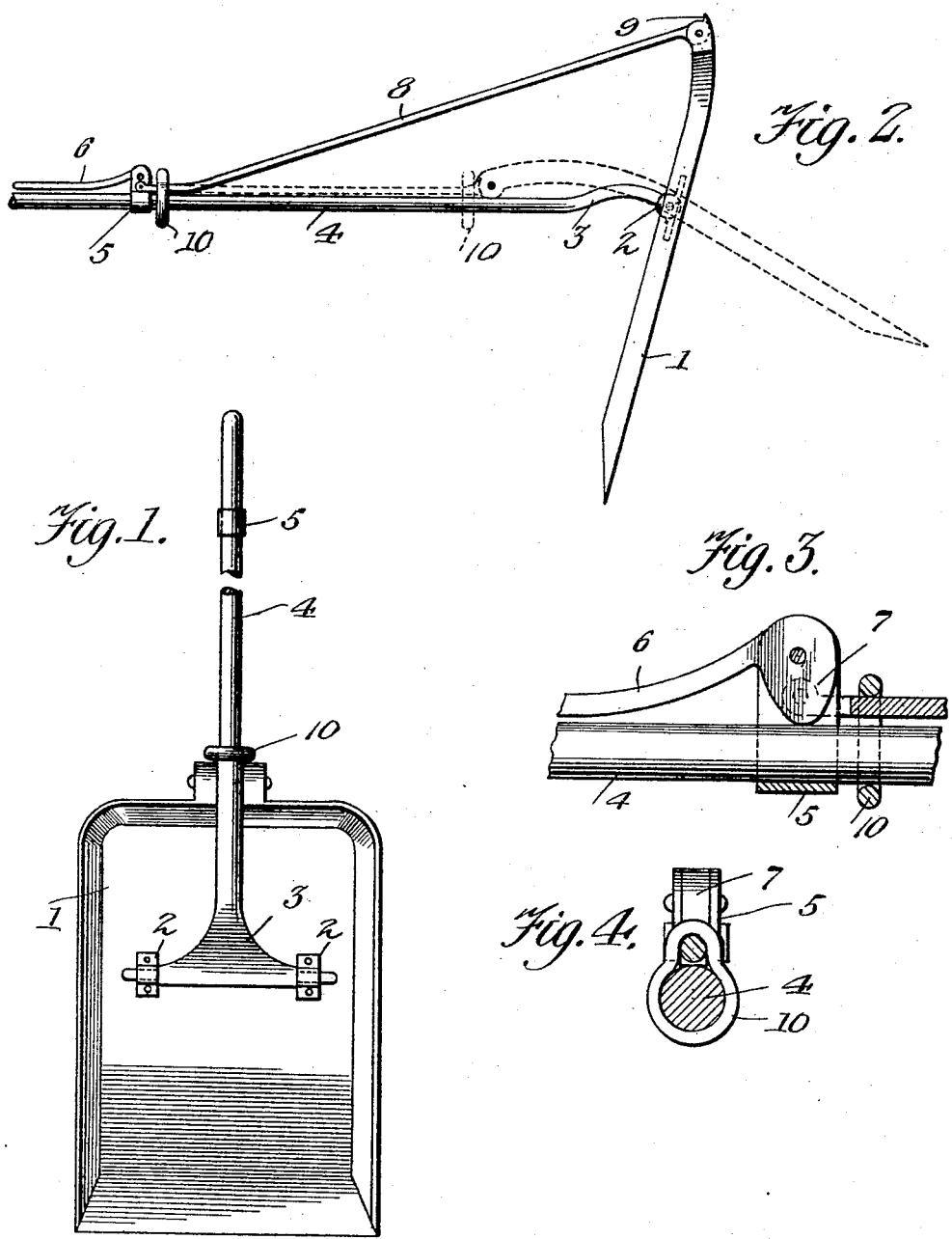

WILLIAM A. BREWSTER, OF REDLANDS, CALIFORNIA.

COMBINED HOE AND SHOVEL.

1,198,319.  Specification of Letters Patent.  Patented Sept. 12, 1916.

Application filed December 14, 1915. Serial No. 66,800.

*To all whom it may concern:*

Be it known that I, WILLIAM A. BREWSTER, a citizen of the United States, residing at Redlands, in the county of San Bernardino and State of California, have invented new and useful Improvements in Combined Hoes and Shovels, of which the following is a specification.

This invention relates to an implement in the form of a combined hoe and shovel and it consists in the novel features hereinafter described and claimed.

An object of the invention is to provide an implement of this character which may be easily and readily transformed from a hoe to a shovel and vice versa and which is especially adapted to be used by gardeners, orchard workers and the like.

With this object in view the implement includes a blade to which a handle is pivotally attached between the upper and lower edges of the said blades. A sleeve is slidably mounted upon the handle and is provided with an eccentric lever adapted to engage the handle whereby the sleeve may be held at an adjusted position upon the handle. The rod is pivotally connected at one end with the upper portion of the blade and pivotally connected at its other end with the said sleeve and at times is adapted to lie in close proximity to the handle when the device is used as a shovel. When the device is used as a hoe the said rod is positioned at an acute angle with relation to the handle. A ring is slidably mounted upon the rod and handle and is adapted to lie against the upper edge of the blade when the device is used as a shovel whereby the rod is held in proper position with relation to the handle.

In the accompanying drawings:—Figure 1 is a side elevation of the combined implement. Fig. 2 is an edge elevation of the same. Fig. 3 is a detailed sectional view of parts of the same. Fig. 4 is a transverse sectional view of the same.

The combined implement comprises a blade 1 which may be of any suitable design or pattern. Lugs 2 are mounted at the forward side of the said blade between the upper and lower edges thereof and a head 3 is pivotally connected with the said lugs. The head 3 is curved longitudinally as best shown in Fig. 2 of the drawing and a handle 4 is connected with the said head in any suitable manner. A sleeve 5 is slidably mounted upon the handle 4 and is provided with a lever 6 having an eccentric or cam end 7 which at times is adapted to engage the side of the handle 4 whereby the sleeve 5 is held at an adjusted position upon said handle. A rod 8 is pivotally connected at one end with the upper edge of the blade 4 and at its other end the said rod is pivotally connected with the sleeve 5. The blade 4 is provided at its upper edge with a shoulder 9 which slides in the path of movement of the rod 8 and is adapted to engage against the side of the said rod when the implement is used as a shovel thus bracing the blade in position with relation to the rod. A ring 10 loosely surrounds the handle 4 and the rod 8 and when the implement is used as a hoe the ring 10 lies in the vicinity of the sleeve 5. When the implement is used as a shovel the ring 10 lies in close proximity to the upper edge of the blade 4 and binds the end portion of the rod 8 against the side of the handle 4.

When the device is used as a hoe the parts are in the positions as shown in heavy lines in Fig. 2 and the parts are held in these positions by swinging the lever 6 so that the cam or eccentric end 7 thereof engages the side of the handle 4. When it is desired to transform the implement from a hoe to a shovel the lever 6 is swung whereby its cam or eccentric end 7 is moved out of engagement with the handle 4 and the sleeve 5 is moved upwardly along the handle 4. After the sleeve 5 has been adjusted along the handle 4 to bring the side of the rod 8 in close proximity to the side of the handle the lever 6 is swung whereby the cam or eccentric end 7 thereof is brought in contact with the side of the hoe and the ring 10 is then slid down along the handle 4 and the rod 8 whereby the said parts are wedged between the opposite sides of the said ring and the ring lies in the vicinity of the upper edge of the blade 1. Thus the rod 8 and the blade 1 are held in fixed relation with respect to the handle 4 and head 3 and the implement may be conveniently used as a shovel.

From the above description taken in conjunction with the accompanying drawing it will be seen that a combined implement of simple and durable structure is provided and that the same may be easily and quickly manipulated for transforming the same from a shovel to a hoe and vice versa.

Having described the invention what is claimed is:

1. A combined implement comprising a blade, a handle pivotally connected with the blade at a point between the upper and lower edges thereof, a sleeve slidably mounted upon the handle, a rod pivotally connected with the blade and the sleeve and a ring loosely surrounding the handle and the rod.

2. A combined implement comprising a blade, a handle pivotally connected with the blade between the upper and lower edges thereof, a sleeve slidably mounted upon the handle, means for securing the sleeve at an adjusted position upon the handle, a rod pivotally connected with the blade and the sleeve, the blade having a lug adapted to engage the side of the rod when the implement is used as a shovel and a ring loosely surrounding a handle and the rod.

3. A combined implement comprising a blade, a handle pivotally connected with the blade between the upper and lower edges thereof, a sleeve slidably mounted upon the handle, a lever fulcrumed upon the sleeve and having a cam end engageable with the side of the handle, to hold the sleeve at an adjusted position upon the handle, a rod pivotally connected with the blade and the sleeve and a ring loosely surrounding the handle and the rod.

In testimony whereof I affix my signature in presence of two witnesses.

WILLIAM A. BREWSTER.

Witnesses:
 MONT. P. CHUBB,
 JACK A. BREWSTER.